(12) United States Patent
Black et al.

(10) Patent No.: US 12,417,106 B2
(45) Date of Patent: Sep. 16, 2025

(54) CONTROL FLOW INTEGRITY ENFORCEMENT AT SCALE

(71) Applicant: Microsoft Technology Licensing, LLC, Redmond, WA (US)

(72) Inventors: Richard John Black, Cambridge (GB); Timothy William Burrell, Cheltenham (GB); Miguel Oom Temudo de Castro, Cambridge (GB); Manuel Silverio da Silva Costa, Cambridge (GB); Kenneth Johnson, Bellevue, WA (US); Matthew Ryan Miller, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/245,511

(22) Filed: Apr. 30, 2021

(65) Prior Publication Data

US 2021/0326153 A1  Oct. 21, 2021

Related U.S. Application Data

(63) Continuation of application No. 13/450,487, filed on Apr. 19, 2012, now Pat. No. 11,003,464.

(51) Int. Cl.
*G06F 9/445* (2018.01)
*G06F 8/41* (2018.01)

(52) U.S. Cl.
CPC .......... *G06F 9/44589* (2013.01); *G06F 8/433* (2013.01)

(58) Field of Classification Search
CPC .............................. G06F 8/433; G06F 9/44589

USPC ......................................................... 717/130
See application file for complete search history.

(56) References Cited

U.S. PATENT DOCUMENTS

| 6,026,234 | A |   | 2/2000 | Hanson et al. |
| 6,026,239 | A |   | 2/2000 | Patrick et al. |
| 6,052,797 | A | * | 4/2000 | Ofek .................. G06F 11/2064 709/219 |

(Continued)

OTHER PUBLICATIONS

Mao, et al., "Software fault isolation with API integrity and multi-principal modules", Retrieved at <<http://people.csail.mit.edu/nickolai/papers/mao-lxfi.pdf>>, Proceedings of SOSP, Oct. 23, 2011, pp. 1-14.

(Continued)

*Primary Examiner* — Bradford F Wheaton
(74) *Attorney, Agent, or Firm* — CALFEE, HALTER & GRISWOLD LLP

(57) ABSTRACT

Various technologies described herein pertain to enforcing control flow integrity by adding instrumentation when source code is compiled or binary code is rewritten. An indirect call to a control transfer target (e.g., in the source code, in the binary code, etc.) can be identified. Moreover, the instrumentation can be inserted prior to the indirect call. The instrumentation can use a bit from a bitmap maintained by a runtime to verify whether the control transfer target is valid. When an executable image that includes the inserted instrumentation runs, execution can be terminated and/or other appropriate actions can be taken when the control transfer target is determined to be invalid; alternatively, execution can continue when the control transfer target is determined to be valid.

20 Claims, 8 Drawing Sheets

(56) References Cited

U.S. PATENT DOCUMENTS

| | | | |
|---|---|---|---|
| 7,337,291 B2 | 2/2008 | Abadi et al. | |
| 7,577,992 B2 | 8/2009 | Abadi et al. | |
| 8,161,453 B2 | 4/2012 | Chrabieh | |
| 8,434,073 B1 | 4/2013 | Satish et al. | |
| 8,600,943 B1 | 12/2013 | Fitzgerald et al. | |
| 8,812,819 B1* | 8/2014 | Langhammer | G06F 17/142 711/219 |
| 8,949,777 B2* | 2/2015 | Ni | G06F 8/52 717/136 |
| 11,003,464 B2 | 5/2021 | Black et al. | |
| 2002/0032718 A1* | 3/2002 | Yates | G06F 9/4486 718/107 |
| 2002/0199073 A1* | 12/2002 | Tamura | H04L 67/1097 714/E11.12 |
| 2005/0055360 A1* | 3/2005 | Chang | G06F 16/10 |
| 2007/0006170 A1* | 1/2007 | Hasse | G06F 11/366 717/131 |
| 2008/0172624 A1* | 7/2008 | Matsutsuka | G06F 9/451 715/762 |
| 2009/0019221 A1* | 1/2009 | Kessler | G06F 12/0284 711/E12.001 |
| 2009/0052804 A1 | 2/2009 | Lewis | |
| 2009/0171652 A1 | 7/2009 | Ishii et al. | |
| 2009/0249289 A1* | 10/2009 | Akritidis | G06F 11/3612 717/108 |
| 2009/0282393 A1 | 11/2009 | Costa et al. | |
| 2009/0327607 A1 | 12/2009 | Tetrick et al. | |
| 2010/0107149 A1* | 4/2010 | Hsu | G06F 9/328 717/168 |
| 2010/0107249 A1* | 4/2010 | Krig | G06F 21/57 726/22 |
| 2011/0138476 A1 | 6/2011 | Black et al. | |
| 2011/0208694 A1 | 8/2011 | Bitar et al. | |
| 2011/0231824 A1 | 9/2011 | Chabbi et al. | |
| 2012/0030412 A1 | 2/2012 | Dhakshinamurthy et al. | |
| 2012/0047342 A1* | 2/2012 | Grusy | G06F 3/067 711/E12.001 |
| 2012/0185863 A1* | 7/2012 | Krstic | G06F 21/53 718/104 |
| 2012/0222014 A1* | 8/2012 | Peretz | G06F 11/3684 717/125 |
| 2013/0145076 A1 | 6/2013 | Chiueh et al. | |
| 2013/0242935 A1* | 9/2013 | Lim | H04W 16/10 370/329 |
| 2013/0283245 A1 | 10/2013 | Black et al. | |
| 2013/0318511 A1* | 11/2013 | Tian | G06F 8/447 717/157 |

OTHER PUBLICATIONS

Chang, et al., "Efficient and Extensible Security Enforcement Using Dynamic Data Flow Analysis", Retrieved at <<http://www.cs.utexas.edu/users/lin/papers/ccs08.pdf>>, Proceedings of CCS, Oct. 27, 2008, pp. 1-12.

Abadi, et al., "Control-Flow Integrity: Principles, Implementations, and Applications", Retrieved at <<http://research.microsoft.com/en-us/um/people/mbudiu/cfi.pdf.>>, Nov. 1, 2004, pp. 1-33.

Wang, et al., "FP-Validator: Validating Type Equivalence of Function Pointers on the Fly", Retrieved at <<http://www.acsac.org/2009/openconf/modules/request.php?module=oc_program&action=view.php&id=204>>, Computer Security Applications Conference, Dec. 3, 2009, p. 51-59.

Costa, et al., "Vigilante: End-to-End Containment of Internet Worm Epidemics", Retrieved at <<http://research.microsoft.com/pubs/80640/a9-costa-TOCS.pdf>>, ACM Transactions on Computer Systems, Dec. 4, 2008, pp. 1-68.

Davi, et al., "MOCFI: A Framework to Mitigate Control-Flow Attacks on Smartphones", Retrieved at <<http://www.informatik.tu-darmstadt.de/fileadmin/user_upload/Group_TRUST/PubsPDF/MoCFI-NDSS-2012.pdf>>, 19th Annual Network & Distributed System Security Symposium, Retrieved Date: Jan. 23, 2012, pp. 1-16.

"Non-Final Office Action for U.S. Appl. No. 13/450,487", Mailed Date: Nov. 6, 2013, 12 Pages.

"Reply to Non-Final Office Action for U.S. Appl. No. 13/450,487", Filed Date: Apr. 5, 2014, 14 Pages.

"Non-Final Office Action for U.S. Appl. No. 13/450,487", Mailed Date: Jul. 28, 2014, 14 Pages.

"Reply to Non-Final Office Action for U.S. Appl. No. 13/450,487", Filed Date: Oct. 27, 2014, 16 Pages.

"Non-Final Office Action for U.S. Appl. No. 13/450,487", Mailed Date: Apr. 9, 2015, 15 Pages.

"Reply to Non-Final Office Action for U.S. Appl. No. 13/450,487", Filed Date: Sep. 7, 2015, 16 Pages.

"Non-Final Office Action for U.S. Appl. No. 13/450,487", Mailed Date: Dec. 16, 2015, 16 Pages.

"Reply to Non-Final Office Action for U.S. Appl. No. 13/450,487", Filed Date: May 16, 2016, 14 Pages.

"Final Office Action for U.S. Appl. No. 13/450,487", Mailed Date: Aug. 18, 2016, 17 Pages.

"Non-Final Office Action for U.S. Appl. No. 13/450,487", Mailed Date: Feb. 15, 2017, 22 Pages.

"Reply to Non-Final Office Action for U.S. Appl. No. 13/450,487", Filed Date: Aug. 15, 2017, 15 Pages.

"Final Office Action for U.S. Appl. No. 13/450,487", Mailed Date: Nov. 30, 2017, 20 Pages.

"Reply to Final Office Action for U.S. Appl. No. 13/450,487", Filed Date: Feb. 2, 2018, 11 Pages.

"Advisory Action for U.S. Appl. No. 13/450,487", Mailed Date: Mar. 1, 2018, 2 Pages.

"Non-Final Office Action for U.S. Appl. No. 13/450,487", Mailed Date: Aug. 16, 2018, 20 Pages.

"Reply to Non-Final Office Action for U.S. Appl. No. 13/450,487", Filed Date: Jan. 16, 2019, 12 Pages.

"Final Office Action for U.S. Appl. No. 13/450,487", Mailed Date: May 14, 2019, 21 Pages.

"Reply to Final Office Action for U.S. Appl. No. 13/450,487", Filed Date: Oct. 14, 2019, 16 Pages.

"Non-Final Office Action for U.S. Appl. No. 13/450,487", Mailed Date: Apr. 30, 2020, 31 Pages.

"Reply to Non-Final Office Action for U.S. Appl. No. 13/450,487", Filed Date: Sep. 30, 2020, 17 Pages.

"Notice of Allowance and Fees Due for U.S. Appl. No. 13/450,487", Mailed Date: Jan. 7, 2021, 5 Pages.

* cited by examiner

| Architecture | CFG alignment | Address space size (max) | Bitmap size | % of VA |
|---|---|---|---|---|
| 32-bit (LAA) | 32 byte | 4 GB | 16 MB | 0.4% |
| 32-bit (non-LAA) | 32 byte | 2 GB | 8 MB | 0.4% |
| 64-bit (LAA) | 32 byte | 8 TB | 32 GB | 0.4% |
| 64-bit (non-LAA) | 32 byte | 2 GB | 8 MB | 0.4% |

CONTROL FLOW INTEGRITY ENFORCEMENT AT SCALE

CROSS-REFERENCE TO RELATED APPLICATION

This application is a continuation of U.S. patent application Ser. No. 13/450,487, filed on Apr. 19, 2012, and entitled "CONTROL FLOW INTEGRITY ENFORCEMENT AT SCALE", the entirety of which is incorporated herein by reference.

BACKGROUND

Various memory safety vulnerabilities associated with computer software may allow for unauthorized access. For instance, a buffer overrun can occur when a program tries to store more data in a buffer than that buffer is intended to hold. Moreover, an attacker can use the buffer overrun to run arbitrary code on a computer of a victim. In order to accomplish the foregoing, the attacker can rely on the ability to divert a flow of execution in a manner that was not originally intended by the program, such as by corrupting a function pointer, virtual table pointer, or return address.

Some conventional approaches to mitigate such memory safety vulnerabilities attempt to enforce various forms of control flow integrity (CFI), which place constraints pertaining to where an attacker can divert the flow of execution. These techniques can generally rely on compile-time or runtime instrumentation that makes use of certain data structures to determine validity of a target address before permitting control flow to be transferred. However, the conventional techniques that use the foregoing instrumentation oftentimes are impractical for large-scale retail deployment due to technical limitations, performance costs (e.g., processing, memory, etc.), incompatibility with legacy environments, agility, and overall effectiveness. These problems have made it generally impractical to realize the benefits of CFI at scale, and have therefore left open problems in software security unmitigated in practice.

SUMMARY

Described herein are various technologies that pertain to enforcing control flow integrity by adding instrumentation when source code is compiled or binary code is rewritten. An indirect call to a control transfer target (e.g., in the source code, in the binary code, etc.) can be identified. Moreover, the instrumentation can be inserted prior to the indirect call. The instrumentation can use information maintained by a runtime to verify whether the control transfer target is valid. For instance, the instrumentation can use a bit from a bitmap maintained by the runtime to verify whether the control transfer target is valid. According to an example, the instrumentation can be a call to an external check routine. By way of another example, the instrumentation can be an inline bitmap check. When an executable image that includes the inserted instrumentation runs, execution can be terminated and/or other appropriate actions can be taken when the control transfer target is determined to be invalid. Alternatively, execution can continue when the control transfer target is determined to be valid.

According to various embodiments, metadata can be emitted when the source code is compiled. The metadata can identify a set of valid control transfer targets for the executable image (e.g., functions that are valid targets of indirect calls). Further, the metadata can be used to initialize a portion of a bitmap managed by a runtime; hence, the metadata is used by checking code to determine whether a given control transfer target is valid.

In accordance with various embodiments, a check can be emitted that detects corruption of a return address or an inconsistent stack state as a result of a call to a valid control transfer target. According to an example, the check can be a security cookie used to verify integrity of the stack when a function returns. Following this example, a function may be called, where that function has a different number of parameters from a number expected by a valid control flow, thereby leading to a stack pointer being adjusted by an incorrect amount when the function returns. While stack data (e.g., return address) may be uncorrupted, the stack pointer may point to an incorrect place on the stack such that an incorrect value may be interpreted or used as the return address. Accordingly, the security cookie can detect the foregoing (e.g., a wrong value on the stack may be used as a local cookie that can fail a check against a global master cookie). By way of another example, the check can be a function signature for address-taken functions.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
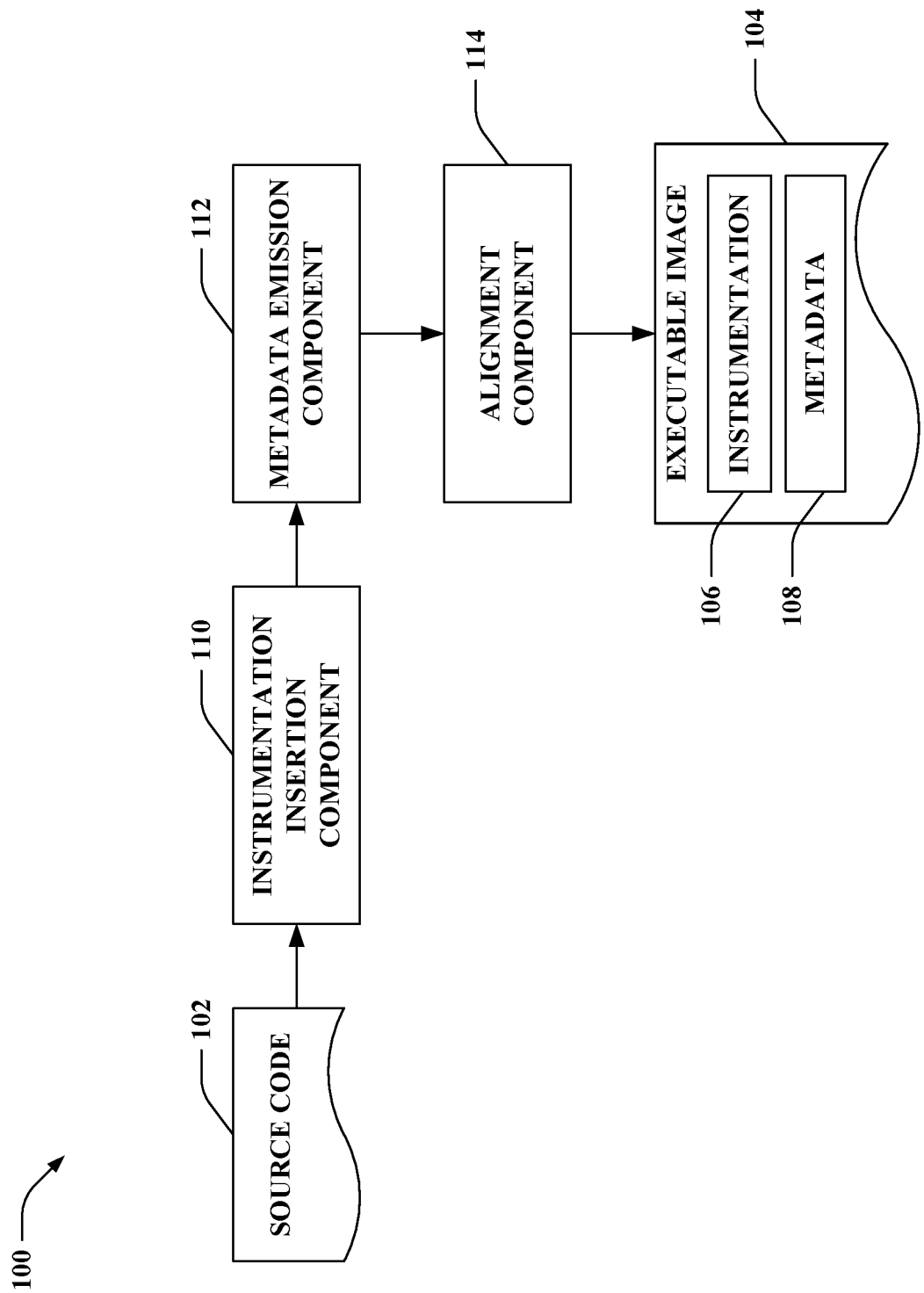
FIG. 1 illustrates a functional block diagram of an exemplary system that compiles source code to generate an executable image.

Various technologies pertaining to enforcing control flow integrity (CFI) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, techniques for efficiently enforcing CFI are provided. In contrast to conventional approaches, the techniques for enforcing CFI set forth herein can enable practical retail deployment at a large-scale. The CFI techniques described herein are henceforth referred to as Control Flow Guard (CFG).

CFG can enforce control flow integrity by adding instrumentation checks when source code is compiled to generate an executable image. A compiler can introduce instrumentation checks prior to certain types of indirect control transfers (such as indirect calls). These checks, which are carried out by the inserted instrumentation, can verify whether or not a target of an indirect control transfer is considered valid just before the control transfer occurs. The checks can also verify whether or not the indirect control transfer has not been perverted by an attacker. In addition to emitting instrumentation checks, the compiler can also emit metadata that identifies a set of functions that are considered valid control transfer targets for a given module (e.g., the executable image). Additionally or alternatively, the metadata emitted by the compiler can identify function(s) that are considered valid indirect control transfer targets for the given module (e.g., via indirect jump(s)). This metadata can be used to enable checking code to determine whether a target address is valid. For example, a runtime can maintain system-wide and per-process state (e.g., in the form of a CFG bitmap), which identifies the set of valid control transfer targets. When a CFG-aware executable image is loaded, the runtime can initialize an appropriate portion of the system-wide or per-process CFG bitmap based on the metadata embedded in the image. Similar steps can be taken when a legacy (e.g., non-CFG) image or a non-image executable memory region is allocated. When the executable image runs, the CFG bitmap maintained by the runtime can be used by the compiler-inserted instrumentation to determine the validity of a control transfer target. If an invalid target is detected by the instrumentation, the executable image can be terminated in a safe fashion and/or other appropriate actions can be taken (e.g., call specific error reporting functionality, make this an assert in debug builds, etc.); otherwise, the executable image can continue executing as normal.

As used herein, the term "executable image" refers to a unit of program code that is in a format that may be executed by a processor. For example, an executable image can be a unit of program code having a file format such as an EXE (executable file) file format, a DLL (dynamic-link library) file format, code emitted by a Just-in-Time (JIT) compiler, or the like.

Referring now to the drawings, FIG. 1 illustrates a system 100 that compiles source code 102 to generate an executable image 104 (e.g., compiled program, CFG-instrumented program, etc.). The executable image 104 generated by the system 100 has instrumentation 106 inserted prior to indirect calls. For instance, the instrumentation 106 can check rights on indirect calls (e.g., check whether a particular function can be indirectly called). Moreover, the executable image 104 includes metadata 108 that informs a runtime about a set of valid indirect call targets associated therewith. Further, it is to be appreciated that components of the system 100 can be included in a compiler and/or a linker.

The system 100 includes an instrumentation insertion component 110 that inserts the instrumentation 106 prior to an indirect call in the source code 102. Accordingly, the instrumentation insertion component 110 can identify an indirect call to a control transfer target (e.g., target address, address of a function being called by the indirect call, etc.) in the source code 102. Moreover, the instrumentation insertion component 110 can insert the instrumentation 106 prior to the indirect call. By way of example, a compiler can include the instrumentation insertion component 110; however, it is to be appreciated that the claimed subject matter is not so limited.

When the executable image 104 is executed, the instrumentation 106 included therein can verify that a target of the indirect call is valid before permitting control transfer to occur. The instrumentation 106 can verify that the target of the indirect call is valid by checking whether a bit is set in a CFG bitmap for the control transfer target, where the CFG bitmap is maintained by a CFG runtime. If the bit is set, the executable image 104 is allowed to continue executing as this indicates that the control transfer target is valid; otherwise, the executable image 104 is terminated. Additionally or alternatively, if the bit is not set, other appropriate actions can be taken (e.g., call specific error reporting functionality, make this an assert in debug builds, etc.); yet, the claimed subject matter is not so limited.

According to an example, the instrumentation 106 inserted by the instrumentation insertion component 110 prior to an indirect call can be a call to an external check routine. Following this example, the instrumentation 106 can call the external check routine, where the external check routine determines whether the bit is set in the CFG bitmap for the supplied target address. By way of another example, the instrumentation 106 inserted by the instrumentation insertion component 110 prior to an indirect call can be an inline bitmap check. In accordance with this example, the instrumentation 106 can directly determine whether the bit is set in the CFG bitmap for the supplied target address. However, it is to be appreciated that the claimed subject matter is not limited to the foregoing exemplary forms of the instrumentation 106 being inserted by the instrumentation insertion component 110.

The following pseudocode provides an example of an indirect call that can be included in the source code 102; yet, it is to be appreciated that the claimed subject matter is not so limited.

```
typedef VOID (*FPTR)( );
FPTR p = ...;
p( );
```

In accordance with various embodiments, the instrumentation 106 inserted by the instrumentation insertion component 110 can be a call to an external check routine (e.g., _guardcf_check_icall). An example of such instrumentation 106 being inserted by the instrumentation insertion component 110 prior to an indirect call is set forth in the pseudocode below; however, it is to be appreciated that the claimed subject matter is not so limited.

```
VOID _guardcf_check_icall(PVOID TargetAddress);
typedef VOID (*FPTR)( );
FPTR p = ...;
_guardcf_check_icall(p);
p( );
```

In the foregoing example, _guardcf_check_icall is an external check routine, which can have its implementation hidden from the executable image 104 (e.g., separate from the executable image 104). The runtime can provide logic for checking the validity of a target address rather than hardcoding this logic into the executable image 104. Accordingly, this approach can enable the runtime to make changes to behavior of the check routine without breaking compatibility or necessitating a recompile of the executable image 104. For example, this can allow the structure of the CFG bitmap to change between versions of the runtime while retaining compatibility with existing CFG-instrumented programs (e.g., existing executable images such as the executable image 104). Similarly, in the event that an optimized hardware CFG check instruction becomes available, the runtime can modify the implementation of the check routine. Hence, existing CFG-instrumented programs can transparently take advantage of the hardware support.

The runtime can provide a CFG-instrumented program with the implementation of the external check routine by either 1) allowing the executable image 104 to import the external check routine from a runtime-provided DLL or 2) exposing an address of a function pointer through metadata 108 in the executable image 104 (where the function pointer is called through by the instrumentation 106). According to an example, exposing the address of the function pointer through metadata 108 in the executable image 104 can be employed for executables that run in environments that do not support a CFG runtime (e.g., legacy operating systems). In both approaches, a function pointer that is called through to execute the external check routine is protected as read-only to prevent an attacker from hijacking control of execution flow when a call is made to the external check routine.

Employment of instrumentation (e.g., the instrumentation 106) that calls an external check routine can provide for future-proofing a design and can enable downlevel scenarios. The foregoing can be balanced against runtime performance costs that can be introduced by the external check routine.

In accordance with other embodiments, the instrumentation 106 inserted by the instrumentation insertion component 110 can be an inline bitmap check. Accordingly, the instrumentation 106 emitted by the instrumentation insertion component 110 (e.g., compiler) can directly check if a bit corresponding with a target address is set in the CFG bitmap (e.g., CfgBitMap). An example of such instrumentation 106 that utilizes an inline bitmap check being inserted by the instrumentation insertion component 110 prior to an indirect call is set forth in the pseudocode below; however, it is to be appreciated that the claimed subject matter is not so limited.

```
typedef VOID (*FPTR)( );
FPTR p = ...;
if ((CfgBitMap[BYTE_INDEX(p)] & (BIT_INDEX(p))) == 0) {
   terminate_program( );
}
p( );
```

Following this example, the instrumentation 106 can directly check if the bit corresponding to the target address is set in the CFG bitmap. Moreover, if the bit corresponding to the target address is set in the CFG bitmap, then execution of the executable image 104 can terminate; otherwise, execution of the executable image 104 can continue.

It is to be appreciated that a sequence of instructions emitted by the instrumentation insertion component 110 to implement the inline bitmap check can depend on a target processor architecture; accordingly, the sequence of instructions can take several forms. Exemplary sequences of instructions for various target processor architectures are set forth below; however, it is to be appreciated that the claimed subject matter is not limited to these exemplary sequences of instructions as it is contemplated that sequences of instructions can be emitted for other target processor architectures, other sequences of instructions can be emitted for the below noted target processor architectures, and so forth.

For example, the target processor architecture can be the x86 processor architecture. Following this example, a possible sequence of instructions to implement the inline bitmap check for such processor architecture is listed below, where the target address can be in the edx register.

```
mov ecx,dword ptr [_CfgBitMap]
mov eax,edx
shr eax,9
mov ecx,dword ptr [ecx+eax*4]
mov eax,edx
shr eax,4
bt ecx,eax
jb okToCall
```

By way of another example, the target processor architecture can be the AMD64 processor architecture. A possible sequence of instructions to implement the inline bitmap check for the AMD64 processor architecture is set forth below, where the target address can be in the r8 register.

```
mov rdx,qword ptr [_CfgBitMap]
mov rax,r8
shr rax,0Ah
mov rcx,qword ptr [rdx+rax*8]
mov rax,r8
shr rax,4
bt rcx,rax
jb okToCall
```

According to a further example, the target processor architecture can be the ARM processor architecture. A possible sequence of instructions to implement the inline bitmap check for the ARM processor architecture is set forth below, where the target address can be in the r1 register.

```
movw r3,_CfgBitMap
movt r3,_CfgBitMap
ldr r2,[r3]
lsrs r3,r1,#7
ldrb r2,[r2,r3]
ubfx r3,r1,#4,#3
lsrs r3,r2,r3
tst r3,#1
bne okToCall
```

The approach that employs the inline bitmap check can reduce execution cost of the instrumentation check compared to the approach that employs a call to an external check routine by mitigating overhead of calling the check routine. However, the inline bitmap check approach can have limited agility of CFG because CFG-instrumented programs take a direct dependency on the layout of the CFG bitmap. This trade-off can be balanced in the following way. For executables that are bound to a specific version of the CFG runtime, the inline check described above can be used without issue as the bitmap check and the runtime version are tightly coupled. In contrast, for executables that are not bound to a specific CFG runtime version or for executables that may run in non-CFG environments (e.g., downlevel platforms), an additional constraint can be introduced by the instrumentation insertion component 110; the additional constraint can skip the integrity check if the CfgBitMap has not been initialized, as set forth in the following exemplary pseudocode.

```
typedef VOID (*FPTR)( );
FPTR p = ...;
if ((CfgBitMap != NULL) && ((CfgBitMap[BYTE_INDEX(p)] &
    (BIT_INDEX(p))) == 0)) {
    terminate_program( );
}
p( );
```

As with the external check routine implementation, memory containing the CfgBitMap variable is protected as read-only after it has been initialized by the CFG runtime. Accordingly, an attacker cannot redirect the CFG bitmap to an invalid region of memory and thus cause certain addresses to appear as valid control transfer targets. Likewise, it is expected that CFG-instrumented executables can expose the address of the variable containing the pointer to the CFG bitmap via metadata in the executable itself, such as by using a field in the load config directory in a portable executable (PE) image. This enables the runtime to update a reference of an executable to a base of the CFG bitmap when an executable is mapped into a process.

By way of example, the CFG bitmap is not at a fixed virtual address (VA). Yet, it is to be appreciated that the claimed subject matter is not so limited.

Moreover, the system 100 includes a metadata emission component 112 that emits the metadata 108 that identify a set of functions in the executable image 104 that are considered to be valid control transfer targets for the executable image 104. For example, the metadata emission component 112 can be included in a compiler and/or a linker.

The metadata emission component 112 can identify the set of functions that have their address taken (e.g., including functions which have their address taken by the linker for fields such as the entry point of the executable image 104). The metadata emission component 112 (e.g., the linker) can emit this information as the metadata 108 in the executable image 104 so that such metadata 108 can be consumed by the CFG runtime. According to an example, a form that the metadata 108 can take is a custom PE section that is symbolically named ".fids" (shorthand for "function identifiers"). Following this example, the PE section can include an array of pointers to entry points of functions within the executable image 104 that can be called indirectly. By way of another example, the metadata 108 can be stored in a format similar to the PE relocation directory where addresses are grouped into page-sized blocks. It is to be appreciated, however, that the claimed subject matter is not limited to the foregoing examples.

It is desirable to minimize a size of the CFG bitmap to reduce costs associated with CFG measured in virtual address range usage, actual memory usage, and cache usage. Moreover, not every address in a computer program can be the valid start of an indirect control transfer. Therefore, it is convenient to consider that entries in the CFG bitmap may be used to identify a range of addresses for indirect control transfer rather than having a distinct entry for every possible address. In this case, a bit in the CFG bitmap identifies a range of addresses for indirect control transfer. Several different variants of the foregoing are possible: (a) the system permits any address for indirect control transfer provided its bit is set in the CFG bitmap, in which case some non-valid addresses could be targets for control transfer, or (b) an additional check is used if the CFG bitmap check passes to refine the target's alignment within the indicated block, or (c) a function which is the valid target of a possible indirect control transfer has its code pattern organized such that only valid control transfers will succeed and non-valid control transfers will fail (e.g., the code pattern of the function provides that an attacker can only possibly call a first byte in the function despite using a single bit per the range of addresses).

Accordingly, the system 100 can further include an alignment component 114 that can align functions that have their address taken. Pursuant to an example, the alignment component 114 can be included in the compiler and/or the linker. Proper alignment of address-taken functions provided by the alignment component 114 can be advisable for various reasons. For instance, each bit in the CFG bitmap corresponds to a linear address that has been right-shifted by a certain amount (e.g., 5 bits which equates to a 32 byte alignment). This shifting has the effect of establishing slots of memory that are considered valid indirect call targets; thus, addresses within an aligned region of memory would be considered a valid indirect call target if the corresponding bit is set in the CFG bitmap. Another reason for proper alignment is to provide that the only valid instruction within an aligned region of memory is the entry point instruction of an address-taken function, which can provide that an unintended instruction stream cannot be executed. By way of illustration, a function having its address taken can be aligned such that an attacker can only jump to a first byte of the function despite associating a bit in the bitmap to a region with more than one byte (e.g., 16 bytes).

The alignment component 114 can align address-taken functions such that a first byte of an entry point instruction is stored in a last byte of an aligned region, and preceding bytes within that aligned region equate to no-op or crash-inducing instructions. Thus, execution from any offset prior to the actual entry point of the instruction executes the intended function or terminates the program. An alternative approach is to add an aligned slot-sized code sequence with a jump followed by crash inducing instructions (e.g., interrupts such as INT 3s, in an aligned region which can be a slot of 16 bytes, etc.) before the function (e.g., in a next slot). Accordingly, again either the jump is executed followed by the rest of the function or the application crashes. Yet another alternative is not to enforce a particular function alignment and instead use a level of indirection. When the address of a function is taken, the compiler can instead take the address of a thunk that jumps to the original function. In this case, one of the alignment techniques is applied to the thunk and the bit for the thunk address in the CFG bitmap is set instead of the one for the function. It is also possible to use combinations of these techniques for different indirect call targets.

A variant of this approach is to align the entry point of a function such that it is the first byte of the aligned region. However, this variant of the approach can lead to the instrumentation 106 verifying that a target address is properly aligned. By extension, the CFG bitmap is expanded such that each aligned region has two bits instead of one bit. The additional bit can be used to inform the check routine that a target address is expected to be properly aligned. Moreover, the additional bit can be included to support legacy scenarios where a non-CFG-instrumented executable is loaded. In this case, it may be desirable to allow every address in the executable to be called indirectly regardless of alignment for compatibility reasons.

While FIG. 1 relates to adding the instrumentation 106 and metadata 108 to the executable image 104 when the source code 102 is compiled, it is to be appreciated that the examples set forth herein can be extended to a scenario where binary code is rewritten. Accordingly, similar to the examples described herein, instrumentation and/or metadata can be added to existing binary code without compiling from source code.

Figure 2:
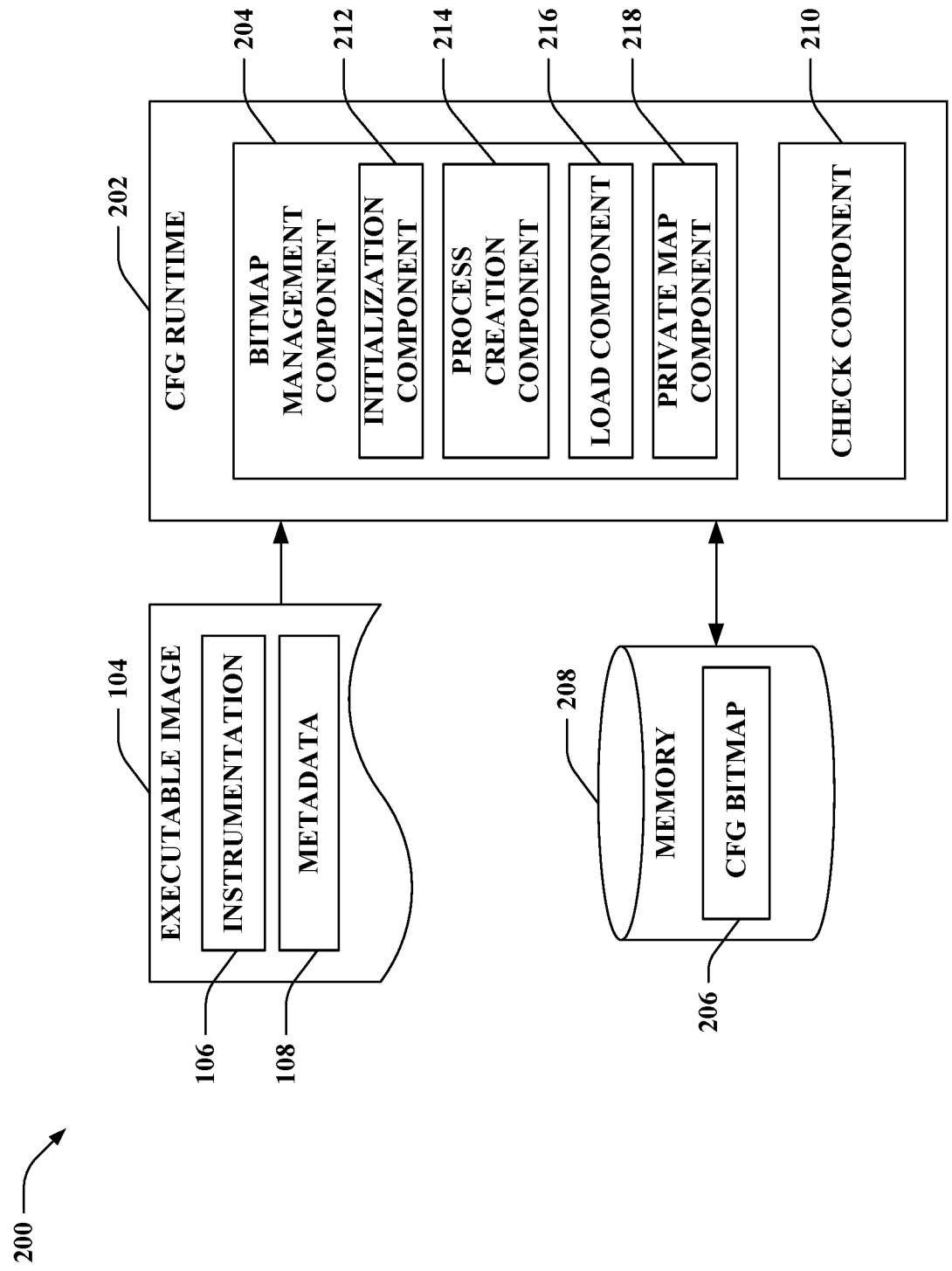
FIG. 2 illustrates a functional block diagram of an exemplary system that executes an executable image which includes instrumentation and metadata.

Now turning to FIG. 2, illustrated is a system 200 that executes the executable image 104 which includes the instrumentation 106 and the metadata 108. The system 200 includes a CFG runtime 202 that supports the execution of the executable image 104. The CFG runtime 202 includes a bitmap management component 204 that manages a CFG bitmap 206. The CFG bitmap 206 identifies valid indirect call targets for system and individual processes. For example, the CFG bitmap 206 can be shared for determining validity of disparate control transfer targets of disparate executable images. Moreover, the CFG bitmap 206 can be retained in memory 208.

Further, the CFG runtime 202 can include a check component 210 that provides an external check routine. Thus, where the instrumentation 106 of the executable image 104 issues a call to an external check routine, the check component 210 can provide the external check routine. For example, the check component 210 can provide the executable image 104 with the implementation of the external check routine by either 1) allowing the executable image 104 to import the external check routine from a runtime-provided DLL or 2) exposing an address of a function pointer through metadata 108 in the executable image 104 (where the function pointer is called through by the instrumentation 106).

By way of example, the CFG runtime 202 can take the form of a component that is integrated with an operating system. In accordance with another example, the CFG runtime 202 can take the form of a standalone component that is loaded on a per-process basis as a DLL or linked statically with each image. Many of the following examples relate to the CFG runtime 202 being a component that is integrated with an operating system, however, it is to be appreciated that such examples can be extended to the CFG runtime 202 being a standalone component.

A challenge with implementing a bitmap-based approach to CFG is the memory cost associated with maintaining the CFG bitmap 206. A direct approach would be to create a private copy of the CFG bitmap 206 on a per-process basis and fully commit pages ahead of time, which may result in significant memory costs. For instance, assuming 32 byte alignment is used for functions with one bit per aligned address, a 32-bit non-large address aware (non-LAA) process (2 GB address space) would then have a 8 MB private page cost whereas a 64-bit large address aware (LAA) process (8 TB address space) would have a 32 GB private page cost. A refinement to this approach would be to reserve an address range upfront and then commit pages within the CFG bitmap 206 on-demand. This can provide an improvement, but there can still be a heavy cost associated with per-process private pages that are associated with commonly loaded system executables.

According to an example, a memory manager in an operating system kernel can have support for Address Space Layout Randomization (ASLR). ASLR relocates executable images at runtime in an effort to improve security and to improve page sharing by reducing a potential for expensive base address conflicts. Thus, for a given system boot, each ASLR compatible DLL is assigned a new chosen base address that is loosely guaranteed to not conflict with any other DLL that is ASLR compatible. Accordingly, it is likely that every ASLR compatible DLL will load at the same base address in every process. Since most images are likely to load at the same base address in every process due to ASLR, the bitmap management component 204 can support sharing of pages within the CFG bitmap 206, which can reduce per-process private page overhead. For example, enabling sharing for the CFG bitmap 206 can be achieved by the bitmap management component 204 through the use of a pagefile-backed section or similar mechanisms.

The bitmap management component 204 can share the CFG bitmap 206. The bitmap management component 204 can further include an initialization component 212, a process creation component 214, a load component 216, and a private map component 218, which can operate at disparate points in system execution to enable sharing of the CFG bitmap 206. For instance, the initialization component 212 can operate when the operating system is initializing, the process creation component 214 can operate when a new process is being initialized (e.g., before it begins executing), the load component 216 can operate when the executable image 104 is being loaded for a first time, and the private map component 218 can operate when a memory mapped view of the executable image is being created in a process and when a non-image private memory mapping is being created in a process.

Figure 3:
FIG. 3 illustrates an exemplary table that includes examples of bitmap size requirements for different architectures.

During system initialization, the initialization component 212 creates a pagefile-backed section to be used for the CFG bitmap 206. According to an example, the initialization component 212 can create two sections for a 64-bit version of an operating system, where one section is used for native 64-bit processes and the second section is used for 32-bit processes capable of running on the 64-bit operating system; yet, it is to be appreciated that the claimed subject matter is not so limited. A size of the CFG bitmap shared section can be based on a maximum size of a user mode virtual address space, an alignment provision for valid targets, and a number of bits per aligned address in the CFG bitmap 206. By way of illustration, an alignment provision of 32 bytes and 1 bit per aligned address in the CFG bitmap 206 can have sizes as set forth in an exemplary table 300 shown in FIG. 3. Yet, it is to be appreciated that the claimed subject matter is not so limited. Moreover, it is noted that when the initialization component 212 creates the section for the CFG bitmap 206, none of the pages in the CFG bitmap 206 are initially committed.

Further, the process creation component 214 maps a reserved, read-only view of the relevant CFG bitmap section into address space of a process that is being created during process creation. By way of example, for 32-bit processes on a 64-bit operating system, two mappings are made (one for each respective bitmap); yet, it is contemplated that the claimed subject matter is not so limited. Moreover, the memory address that the CFG bitmap 206 is mapped to does not need to be fixed. Instead, a base address can be stored in a variable that is referenced by the instrumentation check as described previously.

Moreover, the CFG runtime 202 provides that a user mode is prohibited from unmapping or altering the page protections of the CFG bitmap 206. This retains the integrity of the CFG bitmap 206 for a lifetime of the process.

When the executable image 104 is loaded for the first time, the load component 216 checks to see if the executable image 104 has had its chosen base address selected by ASLR. If this has not occurred, the load component 216 (and the CFG runtime 202 generally) performs no further action at this time.

Alternatively, if the load component 216 detects that the executable image 104 had its chosen base address selected by ASLR, then the load component 216 sets appropriate bits in the corresponding shared CFG bitmap 206 using the chosen base address of the executable image 104. For instance, assuming that the executable image 104 is CFG-aware, then the load component 216 sets the appropriate bits in the CFG bitmap 206 using the metadata 108 embedded in the executable image 104. By way of another example, if an executable is not CFG-aware, then the load component 216 can use a default CFG enforcement policy to determine values to which the corresponding bits may be set (e.g., where "1" equates to "failing open" and "0" equates to "failing closed").

As a result of the load component 216 setting the bits in the CFG bitmap 206, previously uncommitted pages in the shared CFG bitmap 206 are committed and become visible to processes that map the CFG bitmap 206. Further, if insufficient resources exist to commit pages, then the CFG runtime 202 (e.g., the load component 216) can indicate that the image may fail to load. This provides a clean failure path that can be handled by an application.

Moreover, the private map component 218 can selectively create private pages in the CFG bitmap 206 as a function of how the executable image 104 is mapped into memory. For example, the private map component 218 can create private pages when the executable image 104 is not mapped at its chosen base address (e.g., due to a collision) or for non-ASLR-aware or non-CFG-aware images. Alternatively, if the executable image 104 is CFG-aware and/or ASLR aware, and the executable image 104 is mapped at its chosen base address, then the private map component 218 need not create private pages in the CFG bitmap 206.

According to an example, the executable image 104 can be CFG-aware and/or ASLR-aware, and can be mapped at its chosen base address. Following this example, the private map component 218 may inhibit operation since the relevant pages in the CFG bitmap 206 have already been initialized and committed during image loading. However, it is contemplated that an exception to the foregoing is the case where one or more of the CFG bitmap pages corresponding to the executable image 104 have become private for the process in which the memory mapped view is being created. This can occur, for instance, if a non-CFG image was previously mapped into a region that overlaps with the chosen region of the executable image 104. To handle this case, the private map component 218 can check whether any of the pages in the CFG bitmap 206 that correspond to the executable image 104 have become private. If a private page is found, the private map component 218 can set the relevant bits according to the metadata 108 embedded in the executable image 104 or using the default CFG enforcement policy as described above.

By way of another example, the executable image 104 is CFG-aware and/or ASLR-aware, yet the executable image 104 is not mapped at its chosen base address (e.g., due to a collision). When a collision occurs with a CFG-aware or ASLR-aware image, the private map component 218 can create private pages in the CFG bitmap 206 which correspond to the new base address for the executable image 104. The private map component 218 can create the private pages since the base address to which the executable image 104 has been mapped is no longer consistent with the system-wide view (e.g., due to ASLR), and therefore, a CFG bitmap state for the new region is constrained to the process that the executable image 104 is being mapped into. As a result, the relevant bits in the CFG bitmap 206 for the new region are set according to the metadata 108 embedded in the executable image 104 or using the default CFG enforcement policy as previously described.

In accordance with another example, the private map component 218 can create private pages in the CFG bitmap 206 for other image mappings (e.g., for non-ASLR-aware images, non-CFG-aware images, etc.). Accordingly, the private map component 218 can create private pages in the CFG bitmap 206 as described above. Further, the private map component 218 can set the bits according to the default CFG enforcement policy provided herein.

It is to be appreciated that EXE images and DLL images can be handled differently by the private map component 218. For example, EXE images can have their base address randomized on a per-process basis; accordingly, in contrast to treatment of DLL images, the private map component 218 can treat EXE images as a CFG-aware or ASLR-aware image that is not mapped at its chosen base address as described above (e.g., even if there is no collision).

Moreover, in some cases, a process may allocate executable memory that does not correspond to an executable image. Similarly, a process may re-protect memory as executable that was not originally executable. For example, a process may make use of a JIT compiler that generates code on the fly. In these cases, the private map component 218 can elect to create private pages for the corresponding pages in the CFG bitmap 206 and set the bits according to the default CFG enforcement policy. By way of further example, the foregoing scenario can be refined by exposing an interface from the CFG runtime 202 that allows fine-grained control over which bits in the CFG bitmap 206 are set for a private memory mapping. Thus, a CFG-aware JIT compiler can use this interface to enhance restriction of the set of addresses that can be indirectly called.

Various examples described above relate to implementing CFG support within a compiler, linker, and runtime. Moreover, additional exemplary features that can be utilized to further enhance effectiveness of CFG are set forth below. However, it is to be appreciated that the claimed subject matter is not limited to the examples that follow (e.g., one of more of the following features need not be employed, other features that enhance effectiveness of CFG are intended to fall within the scope of the hereto appended claims, etc.).

It is noted that the examples described above relate to control flow integrity for indirect calls. Accordingly, it may also be desirable to protect against corruption of return addresses stored on a thread stack. For instance, failing to protect return addresses stored on the thread stack can enable an attacker to potentially bypass CFG. Yet, application of CFG as described herein to protect return addresses may result in substantial performance costs. For example, applying CFG as described to protect return addresses leads to return sites being properly aligned (akin to address-taken functions) and instrumentation checks being inserted prior to return instructions in a program. Properly aligning return sites may be difficult since the compiler may have to pad out code following a call to ensure the proper alignment, which means there may be additional overhead in the instruction stream (e.g., a relative jump to hop over inserted padding). Further, insertion of instrumentation checks prior to return instructions may cause significant overhead to be incurred that is similar to costs associated with checking the integrity of security cookies inserted by a buffer security check (e.g., /GS).

The following provides various examples of ways that a return address may be corrupted with CFG in place. According to an example, a vulnerability can inherently enable corruption of a return address (e.g., a stack-based buffer overrun). In accordance with another example, a call to a valid control transfer target which expects a different number of parameters than the caller provides can be triggered. Following this example, an imbalancing of the stack pointer when returning to a parent frame can result, which can lead to corruption of a return address. By way of yet a further example, a call to a valid control transfer target which expects parameters of a different type can be triggered. Accordingly, this can result in a callee writing data through a parameter of the wrong type, which results in corruption of a return address. By way of illustration, an attacker may issue a call to an address-taken function such as a function that copies a block of memory (e.g., memcpy) where the caller happens to provide a pointer to the stack as a first parameter.

To mitigate the foregoing, robustness of CFG can be increased without significantly impacting performance cost of the solution as a whole by employing one or more of the features described below.

Figure 4:
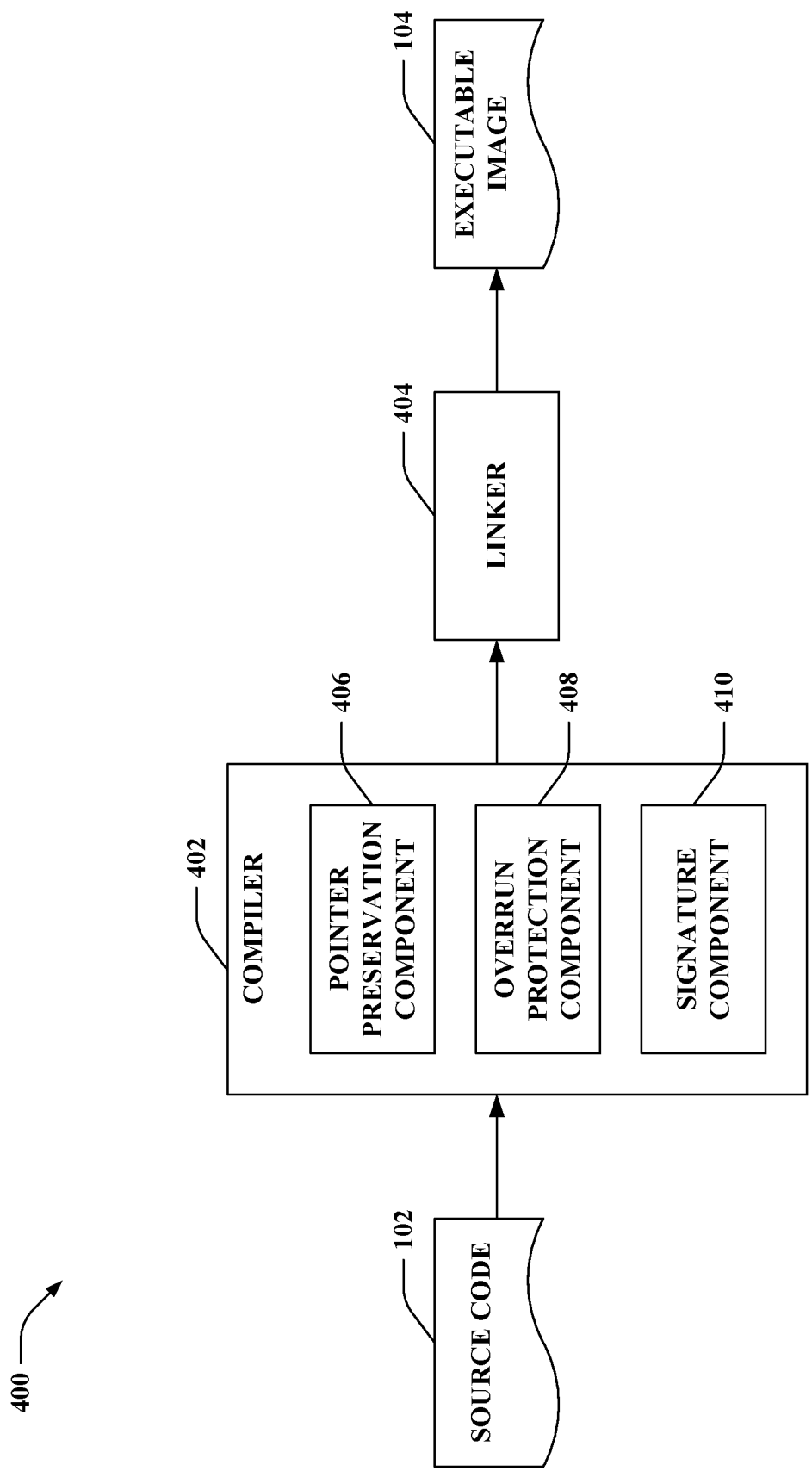
FIG. 4 illustrates a functional block diagram of another exemplary system that compiles the source code to generate the executable image.

Now turning to FIG. 4, illustrated is another system 400 that compiles the source code 102 to generate the executable image 104. The system 400 includes a compiler 402 and a linker 404. Although not shown, it is contemplated that the compiler 402 and/or the linker 404 can include the instrumentation insertion component 110, the metadata emission component 112, and the alignment component 114 of FIG. 1. Moreover, the compiler 402 can include various components that can enhance robustness of CFG. However, it is contemplated that the compiler 402 need not include all of the components described below. Additionally or alternatively, it is to be appreciated that the compiler 402 can include component(s) other than those described below.

The compiler 402 can include a pointer preservation component 406 that can emit code that preserves a stack pointer across calls. The emitted code can be included in the executable image 104. For instance, some calling conventions allow a callee to pop arguments from a stack when the callee returns (e.g., stdcall). For architectures that use these calling conventions, the pointer preservation component 406 of the compiler 402 can emit code to preserve the stack pointer in a non-volatile register prior to making an indirect call. Moreover, the code emitted by the pointer preservation component 406 can restore the stack pointer when the callee returns, for example. Accordingly, the stack pointer can remain consistent regardless a number of arguments popped off the stack by the callee. In accordance with an alternative example, the pointer preservation component 406 can emit code to preserve a frame pointer to restore the stack pointer when the callee returns (provided the frame pointer is not omitted). Moreover, it is noted that the pointer preservation component 406 need not emit code that preserves the stack pointer across calls for calling conventions where the callee does not pop arguments from the stack (e.g., AMD64, ARM). Further, it is noted that preserving the pointer across calls may lead to the compiler 402 spilling additional state to the stack as a result of increased non-volatile register pressure.

By way of another example, the pointer preservation component 406 can emit code that checks whether the stack pointer has an expected value after an indirect call. Thus, instead of restoring the stack pointer when the callee returns, the code emitted by the pointer preservation component 406 can check whether, after the indirect call, the stack pointer is equal to the expected value preserved in a non-volatile register prior to making the indirect call. This can provide enhanced security compared to restoring the stack pointer because the executable image 104 can be terminated if the stack pointer does not have the expected value. On the other hand this check may have higher overhead than restoring the stack pointer. According to another example, it is contemplated that the foregoing can instead use the frame pointer when available.

The compiler 402 can further insert check(s) in the executable image 104 that detect inconsistencies on a stack (e.g., corruption of a return address from a control transfer target on the stack). According to an example, the compiler 402 can include an overrun protection component 408 and/or a signature component 410 to emit the aforementioned check(s). Moreover, corruption of a return address from a control transfer target on the stack can be detected using the check(s) inserted in the executable image 104.

The overrun protection component 408 employs an additional buffer security check heuristic that elects to emit a security cookie for a function making an indirect call. Thus, the overrun protection component 408 can augment the buffer security check, where the buffer security check can detect buffer overruns that overwrite a function's return address, exception handler address, or certain types of parameters. According to an example, the overrun protection component 408 can also emit a security cookie for transitive callers of the function within a module; however, it is to be appreciated that the claimed subject matter is not so limited.

The security cookie emitted by the overrun protection component 408 can be used to verify the integrity of the stack when the function returns. To enhance effectiveness, the overrun protection component 408 can also elect to incorporate an intended return address of the function as one of the parameters that is used to compute the value of the security cookie. This would enable the buffer security check to detect corruption of a return address even if the value of the security cookie on the stack is not modified. By taking this approach, return addresses can be protected against corruption that may occur as a result of calling a function which expects parameters of different types or expects to be called in a different context. An additional extension to this approach can be to disable shadow parameter copying of the buffer security check when this heuristic is the sole reason for electing to emit a security cookie; yet, the claimed subject matter is not limited to the foregoing example.

The signature component 410 can compute a function signature for address-taken functions. Moreover, the signature component 410 can store the function signatures in a location that can be discovered based off the target address provided to a check routine (e.g., a known-fixed delta from an entry point of a function). The signature component 410 can also extend the instrumentation logic by first computing the signature for the function being called at an indirect call and then emitting logic to compare that signature against the target function's signature.

For instance, placing additional restrictions on the set of functions that can be called at a particular call site can help to prevent secondary corruption of a return address on the stack. Thus, the function signature supplied by the signature component 410 can be employed to provide such restrictions. The function signature can take into account variables such as the calling convention, parameter count, and possibly parameter types of a function being called. Accordingly, smaller equivalence classes for the set of functions that can be called from any given call site can be established. By way of another example, it is contemplated that interprocedural points-to analysis can be used to compute a static approximation of the set of functions pointed to by each pointer and use this to restrict allowed call target; yet, the claimed subject matter is not limited to the foregoing example.

The function signatures are handled in a manner that enables compatibility with components that are not CFG aware. By way of example, to address the foregoing, a CFG bitmap (e.g., the CFG bitmap 206 of FIG. 2) can be extended to have two bits per aligned address, where the additional bit state indicates that the corresponding aligned address has a function signature that is to be checked. The instrumentation code can then see if this bit state is set and act accordingly.

Moreover, the function signatures are agile in the face of possible changes to the algorithm used to compute such signatures. Accordingly, the compiler 402 and runtime (e.g., the runtime CFG 202 of FIG. 2) support versioned function signatures. A versioned function signature is represented by a data structure that includes one or more possible function signatures in the form of an array. Each possible signature in the array corresponds to a signature value that would be computed for a specific version of a function signature computation algorithm used by CFG. In this way, when CFG introduces a new algorithm for computing function signatures, the legacy algorithms are still retained and their values are computed in addition to the new algorithm. By taking this approach, the algorithm used to compare function signatures is the algorithm which is the greatest common denominator between a CFG-instrumented caller and a CFG-instrumented callee. This has the effect of enabling older CFG-instrumented code to call newer CFG-instrumented code which uses a different function signature algorithm. Likewise, this also enables newer CFG-instrumented code to call older CFG-instrumented code for the same reason.

The following sets forth various general considerations pertaining to the techniques describe herein. It is to be appreciated, however, that the claimed subject matter is not limited by the below discussion.

The techniques described herein can enable validity of a target address to be determined prior to permitting control flow to be transferred. In comparison to conventional approaches, performance, compatibility, agility, and effectiveness can be enhanced using the techniques set forth herein.

Performance

The CFG implementation described herein can minimize the execution cost of performing integrity checks by permitting efficient inlining in cases where it is possible. Moreover, while the features described above in connection with FIG. 4 can carry an execution cost on top of the bitmap checks, these features can be employed in the absence of write integrity checks. Further, the memory cost associated with maintaining the CFG bitmap can be minimized through efficient sharing of pages.

Compatibility

The CFG techniques described herein can be compatible with legacy code by failing open in cases where a non-CFG image is loaded or an executable non-image memory region is allocated. Accordingly, the CFG techniques set forth herein can be used in a large-scale deployment.

Agility

A design of CFG noted herein can be flexible in terms of enabling future changes to be made without invalidating previous deployments of CFG. For example, if the instrumentation logic is implemented as a call to an external check routine, then details of the mechanism used to check the validity of a target address can be hidden. Hence, changes to the external check routine can be permitted without recompiling, etc.

Effectiveness

A system which implements CFG as described herein can place significant constraints on where execution flow may be diverted to in the event that a function pointer or virtual table pointer becomes corrupted. Further, the features described above in connection with FIG. 4 can enhance robustness of CFG against possible corruption of a return addresses on the stack.

Figure 5:
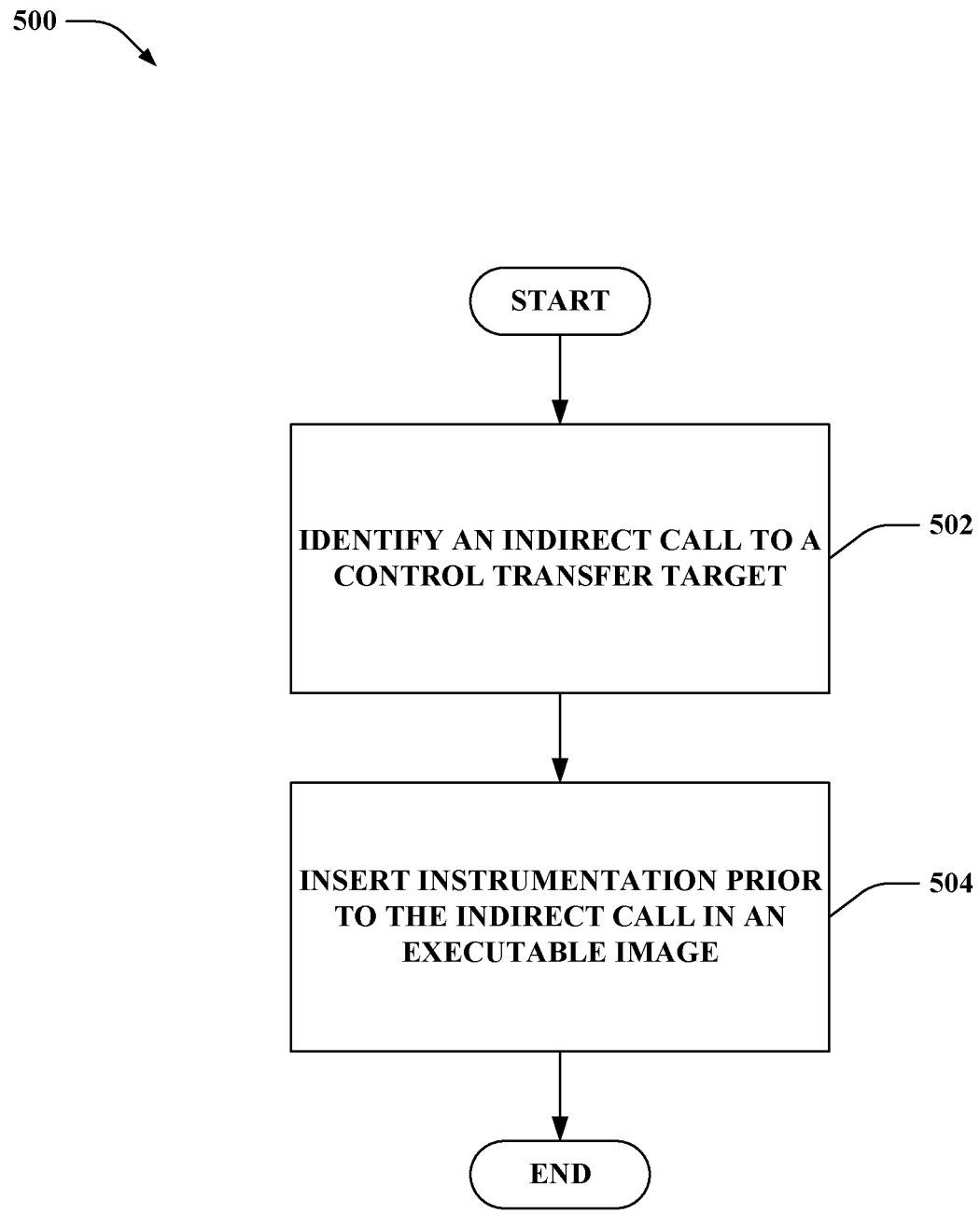
FIG. 5 is a flow diagram that illustrates an exemplary methodology of generating an executable image.
Figure 6:
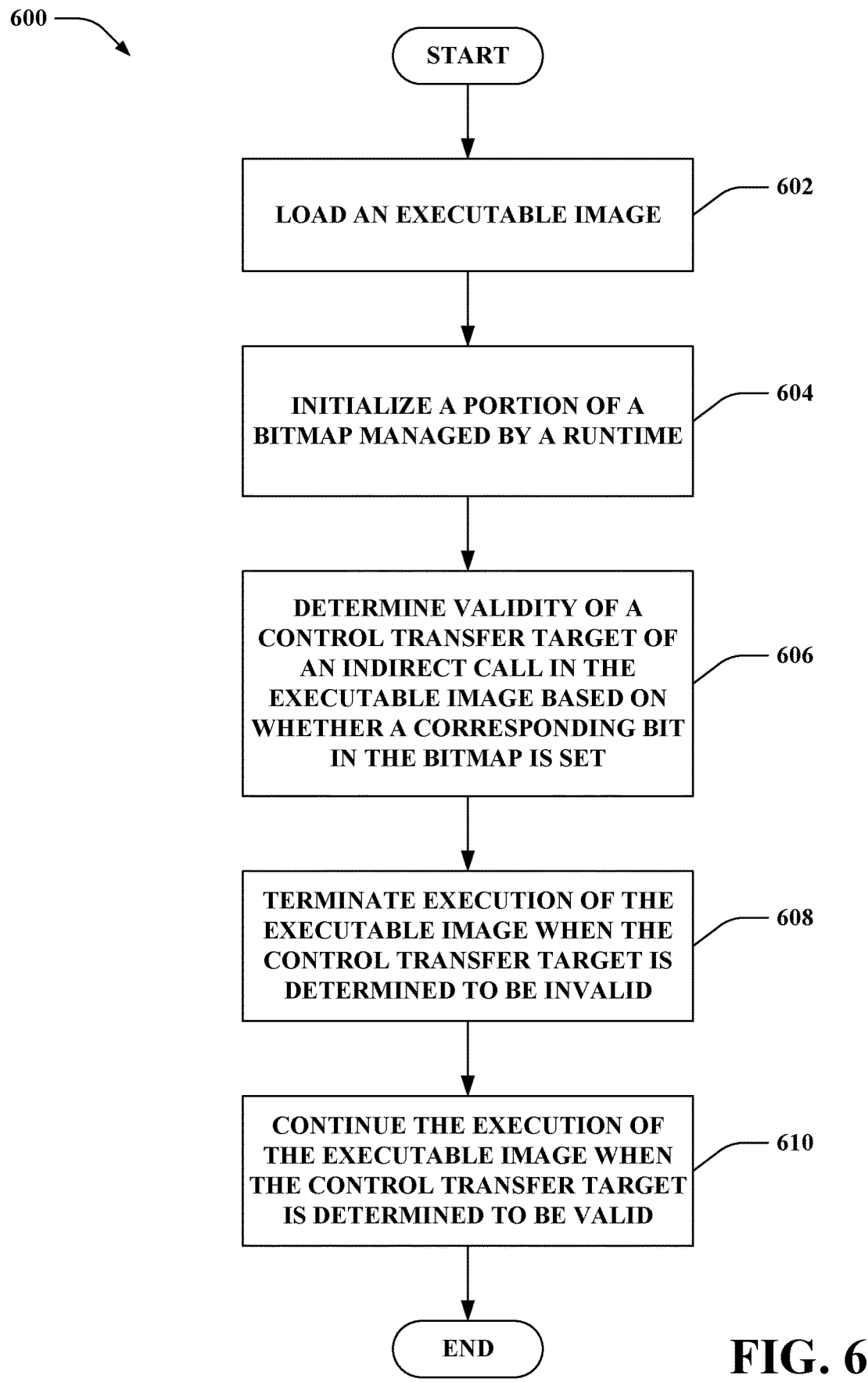
FIG. 6 is a flow diagram that illustrates an exemplary methodology of running an executable image.
Figure 7:
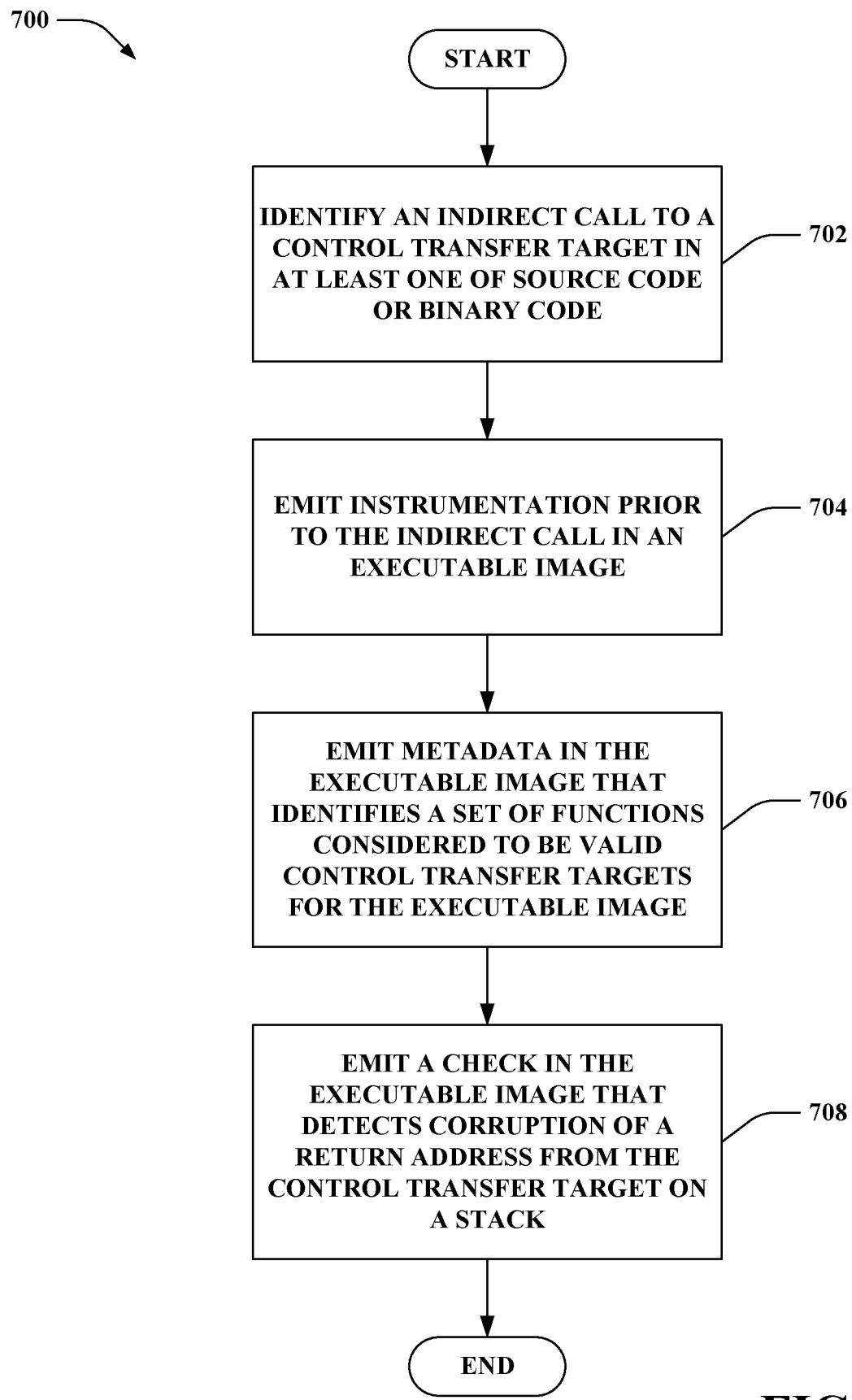
FIG. 7 is a flow diagram that illustrates an exemplary methodology of generating an executable image.

FIGS. 5-7 illustrate exemplary methodologies relating to control flow integrity enforcement. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 5 illustrates a methodology 500 of generating an executable image. At 502, an indirect call to a control transfer target can be identified. At 504, instrumentation can be inserted prior to the indirect call in the executable image. The instrumentation can use a bit from a bitmap maintained by a runtime to verify whether the control transfer target is valid.

Turning to FIG. 6, illustrated is a methodology 600 of running an executable image. At 602, the executable image can be loaded. At 604, a portion of a bitmap managed by a runtime can be initialized. The portion of the bitmap can be initialized based on metadata embedded in the executable image. At 606, validity of a control transfer target of an indirect call in the executable image can be determined based on whether a corresponding bit in the bitmap is set. At 608, execution of the executable image can be terminated when the control transfer target is determined to be invalid. At 610, the execution of the executable image can continue when the control transfer target is determined to be valid.

Now referring to FIG. 7, illustrated is a methodology 700 of generating an executable image. At 702, an indirect call to a control transfer target in at least one of source code or binary code can be identified. At 704, instrumentation can be emitted prior to the indirect call in the executable image. The instrumentation can use a bit from a bitmap maintained by a runtime to verify whether the control transfer target is valid. At 706, metadata that identifies a set of functions considered to be valid control transfer targets for the executable image can be emitted in the executable image. At 708, a check that detects corruption of a return address from the control transfer target on a stack can be emitted in the executable image.

Figure 8:
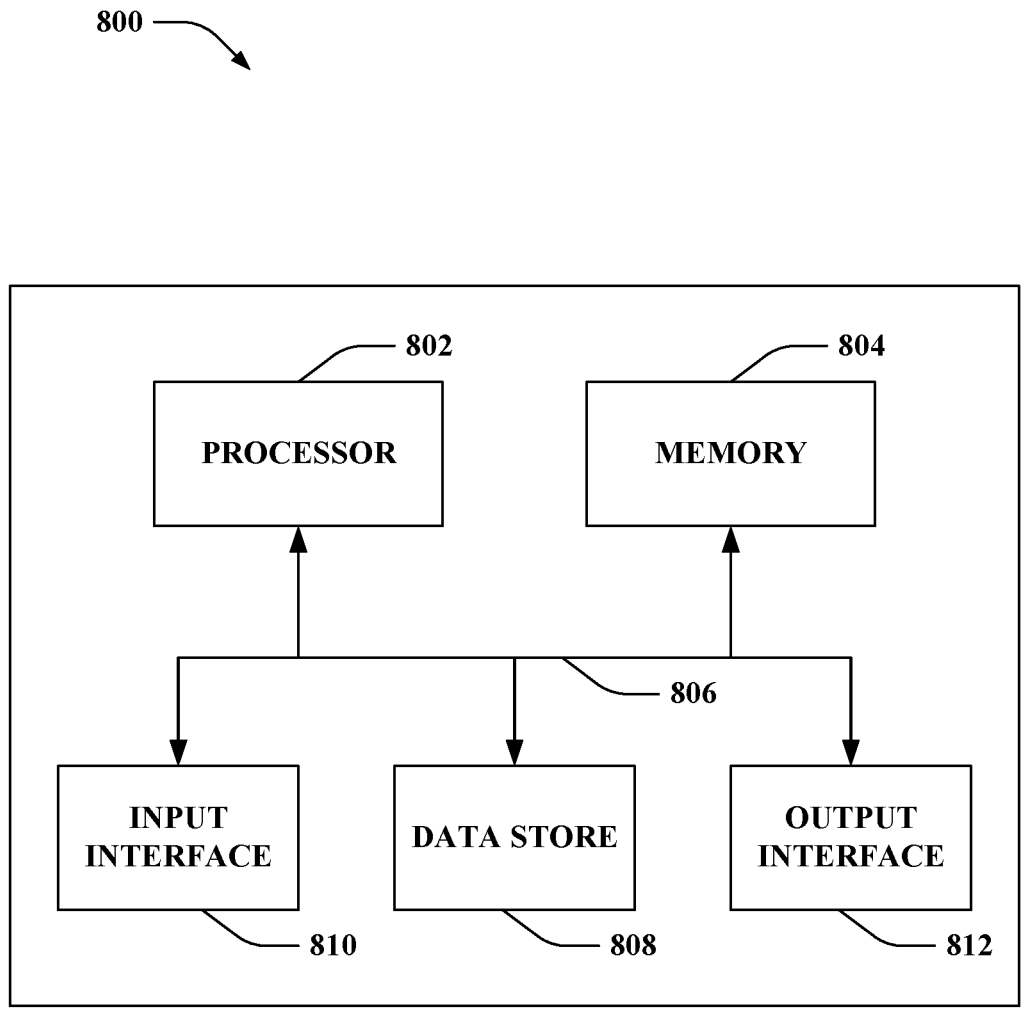
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be used in a system that enforces control flow integrity. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store source code, executable images, a CFG bitmap, and so forth.

The computing device 800 additionally includes a data store 808 that is accessible by the processor 802 by way of the system bus 806. The data store 808 may include executable instructions, source code, executable images, a CFG bitmap, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of running an executable image, the method executed by a processor and comprising:
    loading the executable image;
    initializing a portion of a bitmap managed by a runtime, wherein the portion of the bitmap is initialized based on metadata embedded in the executable image;
    determining validity of a control transfer target of an indirect call in the executable image based on whether a corresponding bit in the bitmap is set, wherein the validity of the control transfer target is determined by detecting corruption of a return address from the control transfer target on a stack by verifying a function signature of the control transfer target being called by the indirect call responsive to the corresponding bit in the bitmap being set, wherein the bitmap comprises two bits per aligned address, and wherein a state of one of the two bits indicates that the corresponding aligned address has the function signature to be checked;
    terminating execution of the executable image when the control transfer target is determined to be invalid; and
    continuing the execution of the executable image when the control transfer target is determined to be valid.

2. The method of claim 1, wherein the bitmap is shared for determining validity of a disparate control transfer target of a disparate executable image.

3. The method of claim 1, further comprising:
    creating a pagefile-backed section to be used for the bitmap during operating system initialization;

mapping a reserved, read-only view of the pagefile-backed section into address space of a process during creation of the process;

determining whether the executable image is loaded at a chosen base address;

setting a bit associated with the executable image in the bitmap based on the metadata embedded in the executable image when the executable image is loaded at the chosen base address; and creating a private page in the bitmap when the executable image is loaded at a disparate base address that differs from the chosen base address, wherein the private page in the bitmap corresponds to the disparate base address.

4. The method of claim 1, wherein the validity of the control transfer target is determined by instrumentation included in the executable image.

5. The method of claim 4, wherein the instrumentation included in the executable image is a call to an external check routine, and wherein the external check routine determines whether the bit from the bitmap is set for the control transfer target.

6. The method of claim 4, wherein the instrumentation included in the executable image is an inline bitmap check that directly determines whether the bit from the bitmap is set for the control transfer target.

7. The method of claim 1, further comprising detecting the corruption of the return address from the control transfer target on the stack using a check inserted in the executable image.

8. The method of claim 7, further comprising detecting the corruption of the return address on the stack using a security cookie for a function that calls the control transfer target, wherein a value of the security cookie is computed based on an intended return address of the function.

9. The method of claim 1, wherein the function signature is verified using a versioned function signature that is represented by a data structure that includes one or more possible function signatures for a function being called by the indirect call in an array, and wherein the possible function signatures correspond to values computed using different versions of a function signature computation algorithm.

10. The method of claim 1, wherein a bit in the bitmap identifies a range of addresses for indirect control transfer, and wherein a code pattern of a function provides that only a first byte in the function is possibly called.

11. A system that executes an executable image, comprising:

at least one processor; and memory that comprises computer-executable instructions that, when executed by the at least one processor, cause the at least one processor to perform acts including:

loading the executable image;

initializing a portion of a bitmap managed by a runtime, wherein the portion of the bitmap is initialized based on metadata embedded in the executable image;

determining validity of a control transfer target of an indirect call in the executable image based on whether a corresponding bit in the bitmap is set, wherein the validity of the control transfer target is determined by detecting corruption of a return address from the control transfer target on a stack by verifying a function signature of the control transfer target being called by the indirect call responsive to the corresponding bit in the bitmap being set, wherein the bitmap comprises two bits per aligned address, and wherein a state of one of the two bits indicates that the corresponding aligned address has the function signature to be checked;

terminating execution of the executable image when the control transfer target is determined to be invalid; and continuing the execution of the executable image when the control transfer target is determined to be valid.

12. The system of claim 11, wherein the bitmap is shared for determining validity of a disparate control transfer target of a disparate executable image.

13. The system of claim 11, wherein the validity of the control transfer target is determined by instrumentation included in the executable image.

14. The system of claim 11, the memory further comprising computer-executable instructions that, when executed by the at least one processor, cause the at least one processor to perform acts including:

detecting the corruption of the return address from the control transfer target on the stack using a check inserted in the executable image.

15. The system of claim 11, wherein a bit in the bitmap identifies a range of addresses for indirect control transfer, and wherein a code pattern of a function provides that only a first byte in the function is possibly called.

16. The system of claim 11, wherein loading the executable image comprises:

checking whether a base address has been chosen for the executable image; and setting a corresponding bit in the bitmap pertaining to the base address when the base address has been chosen.

17. The system of claim 11, wherein the function signature is verified using a versioned function signature that is represented by a data structure that includes one or more possible function signatures for a function being called by the indirect call in an array, and wherein the possible function signatures correspond to values computed using different versions of a function signature computation algorithm.

18. A computer-readable storage medium including computer-executable instructions that, when executed by a processor, cause the processor to perform acts including:

loading an executable image;

initializing a portion of a bitmap managed by a runtime, wherein the portion of the bitmap is initialized based on metadata embedded in the executable image;

determining validity of a control transfer target of an indirect call in the executable image based on whether a corresponding bit in the bitmap is set, wherein the validity of the control transfer target is determined by detecting corruption of a return address from the control transfer target on a stack by verifying a function signature of the control transfer target being called by the indirect call responsive to the corresponding bit in the bitmap being set, wherein the bitmap comprises two bits per aligned address, and wherein a state of one of the two bits indicates that the corresponding aligned address has the function signature to be checked;

terminating execution of the executable image when the control transfer target is determined to be invalid; and continuing the execution of the executable image when the control transfer target is determined to be valid.

19. The computer-readable storage medium of claim 18, wherein the bitmap is shared for determining validity of a disparate control transfer target of a disparate executable image.

20. The computer-readable storage medium of claim 18, wherein the validity of the control transfer target is determined by instrumentation included in the executable image.

* * * * *